J. W. KELLEY.
Whip Socket.
No. 77,049.            Patented April 21, 1868.
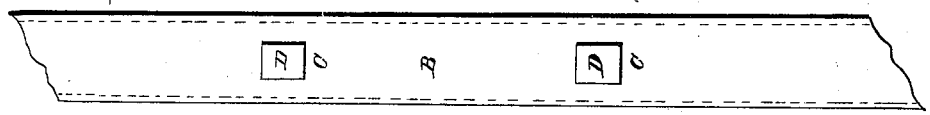
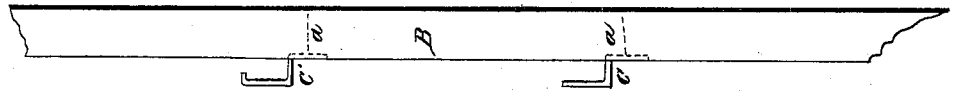
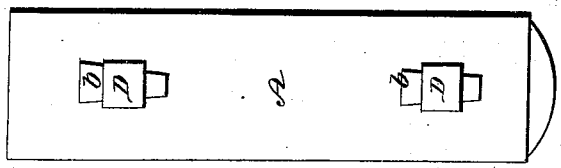
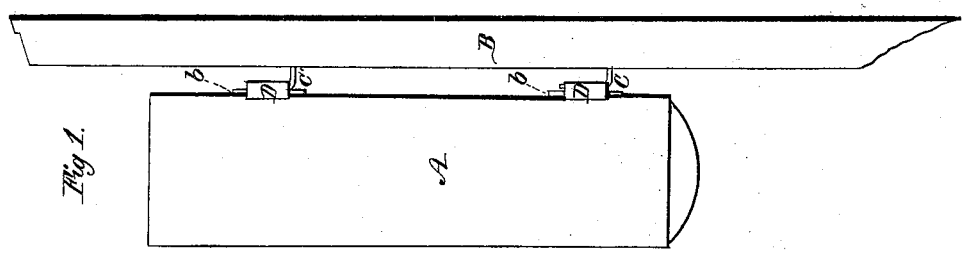
Witnesses:        Inventor:

United States Patent Office.

J. W. KELLEY, OF CLEVELAND, OHIO.

Letters Patent No. 77,049, dated April 21, 1868.

IMPROVEMENT IN THE MODE OF ATTACHING WHIP-SOCKETS.

The Schedule referred to in these Letters Patent and making part of the same.

TO ALL WHOM IT MAY CONCERN:

Be it known that I, J. W. KELLEY, of Cleveland, in the county of Cuyahoga, and State of Ohio, have invented certain new and useful Improvements in Whip-Sockets; and I do hereby certify that the following is a full and complete description of the same, reference being had to the accompanying drawings, making a part of this specification, in which—

Figure 1 is a side view of the socket as attached to the dash-board.

Figure 2, a view of the socket detached.

Like letters of reference refer to like parts in the views.

The nature of my invention relates to the manner of attaching a whip-socket to the dash-boards of carriages, without the use of a strap and buckle, as is required in the ordinary way of attachment.

In fig. 1, A represents the socket, which is of the ordinary description, and B the dash-board of the carriage, to which it is attached by the hooks C C', said hooks being inserted between the frame of the board and covering, and thereto secured by a rivet or screw, as indicated by the dotted lines a, fig. 3. These hooks ordinarily will require no screw or rivet, the strength of the leather or covering being sufficient to hold them, unless unusual strength is required.

In the side of the socket, and at such points as will conform relatively to the position of the hooks, are made incisions, in which are inserted the loops D, for the admission of the hooks which are inserted, as shown in fig. 1. The sockets, when thus attached to the hooks, are prevented from being disengaged by a nib, c, fig. 1, which, as will be observed, proceeds inward toward the board, projecting over the upper edge of the loops, preventing the socket from being moved upward without first forcing back the nib beyond the edge of the loops.

In order to prevent the hook and nib from being forced back so that the socket would become detached accidentally, one elastic key, b, is inserted between the hook and socket, as shown in fig. 1, the expansive force of which will keep the nib projected over the edge of the loop, and thus prevent a disengagement of the loop and hook, as above said.

The elastic key being made wedging in shape, tapering from the top downward, will not fall through the loops, and allow the hook to fall back, and become disengaged from the loops; hence the whole device is secure and permanent, easily applied, and alike to all carriages. It is also neater in appearance than the old way, which, as above said, requires a strap to surround the socket, and a buckle to secure it. It also requires that a hole be cut through the leather of the dash, all of which has a rude and unneat appearance.

What I claim as my improvement, and desire to secure by Letters Patent, is—

The hooks C, loops D, key b, as arranged, in combination with the socket A, for the purpose and in the manner substantially as set forth.

J. W. KELLEY.

Witnesses:
W. H. BURRIDGE,
DAVID McINTOSH.